United States Patent [19]

Morishita

[11] Patent Number: 4,488,073
[45] Date of Patent: Dec. 11, 1984

[54] STARTER WITH MAGNET TYPE D.C. MOTOR

[75] Inventor: Akira Morishita, Himeji, Japan

[73] Assignee: Mitsubishi Denki Kabushiki Kaisha, Japan

[21] Appl. No.: 458,933

[22] Filed: Jan. 18, 1983

[30] Foreign Application Priority Data

Jan. 27, 1982 [JP] Japan ............................ 57-10445[U]

[51] Int. Cl.³ ............................................ H02K 5/10
[52] U.S. Cl. ...................................... 310/83; 310/42; 310/89; 310/154; 310/254
[58] Field of Search ...................... 310/42, 43, 83, 89, 310/154, 254, 258

[56] References Cited

U.S. PATENT DOCUMENTS 3,100,270 8/1963 Case et al. ............................ 310/154
3,444,402 5/1969 Cartier ............................ 310/154 X Primary Examiner—Mark O. Budd
Attorney, Agent, or Firm—Leydig, Voit, Osann, Mayer and Holt, Ltd.

[57] ABSTRACT

In a starter wherein planetary reduction gears are installed on an end part of an output shaft of a magnet type D.C. motor; a starter comprising an intermediate frame member in which a ring gear constituting the planetary reduction gears, and an intermediate bracket for supporting the output shaft of the D.C. motor are integrally formed, and on which poles of the D.C. motor are held.

3 Claims, 3 Drawing Figures

STARTER WITH MAGNET TYPE D.C. MOTOR

BACKGROUND OF THE INVENTION

This invention relates to a starter with a magnet type D.C. motor which has planetary reduction gears installed on the end part of an output shaft thereof.

FIG. 1 shows a prior-art starter of this type. Referring to the figure, the starter 1 has a magnet type D.C. motor 2 which is fixed to a bracket 3 by through bolts, not shown. Numeral 4 designates a tubular yoke, and a plurality of poles 5 made of ferrite permanent magnets are fastened to the inner peripheral surface thereof with an adhesive. Numeral 6 designates an intermediate bracket, which is fitted on the inner peripheral surface of the yoke 4 along with a ring gear 7. The intermediate bracket 6 supports the output end part of the rotary shaft 10 of an armature 9 through a sleeve bearing 8 which is fitted on the inner peripheral surface of a cylindrical protrusion 6a provided centrally of the intermediate bracket. An armature core 11 is fitted on the rotary shaft 10, an armature coil 12 is wound in the slots (not shown) of the armature core 11, a commutator 13 is connected to the armature coil 12, a brush 14 energizes the armature 9 in sliding contact with the commutator 13, and a bind 15 is mounted on the armature coil 12. In addition, a rear bracket 16 is fitted on a socket portion 4a provided at the rear end of the yoke 4, while a sleeve bearing 17 is fitted on a protrusion 16a provided centrally of the rear bracket 16 and supports the rear end of the rotary shaft 10. Numeral 18 indicates a cap for sealing the rear end part, and numerals 19, 20 and 21 indicate thrust washers. Further, a spur gear 22 is formed at the front end part of the rotary shaft 10 and has a planet gear 23 held in mesh therewith. A sleeve bearing 24 is fitted on the inner peripheral surface of the planet gear 23, and it is supported by a supporting pin 27 which is fitted on the housing 26 of an overrunning plutch 25. Numeral 28 indicates a roller, and numeral 29 a clutch-inner. A rotary output shaft 30 is fastened to the clutch-inner 29, and has a pinion 32 spline-fitted with a helical spline 31 which is formed in the outer peripheral surface of the rotary output shaft. Numeral 33 denotes a washer, and numeral 34 a cover which unitarily fastens the housing 26, roller 28 and clutch-inner 29 in engagement through the washer 33. A washer 35 fastens a link 36 in engagement with the pinion 32, and a shift lever 37 is brought into cam engagement with the link 36 so as to shift the pinion 32 frontwards. A sleeve bearing 38 is fitted in a recess 29a provided in the inner peripheral surface of the clutch-inner 29, and supports the front end part of the rotary shaft 10. A spacer 39 is fastened in engagement with the end face of the tooth portion of the ring gear 7, and is mounted in the state in which it is held between the front bracket 3 and the yoke 4.

The prior-art starter 1 operates as described below. When the shift lever 37 is turned by means of an electromagnetic switch, not shown, the pinion 32 is shifted frontwards on the spline 31 of the rotary output shaft 30 and meshes with the ring gear of an internal combustion engine, not shown. Thereafter, when the main contact (not shown) of the aforementioned electromagnetic switch is closed, a supply voltage is applied to the brush 14, and the armature 9 is energized to generate a turning force. The turning force of the armature is transmitted to the spur gear 22 on the rotary shaft 10, and is further transmitted to the overruning clutch 25 through the pin 27 after the turning speed of the spur gear has been decelerated by the planet gear 23. Owing to the resultant turning force, the pinion 32 is urged to rotate in one direction through the roller 28, clutch-inner 29 and helical spline 31 on the rotary output shaft 30. Thus, the internal combustion engine is started.

Since the prior-art starter is constructed and operated as described above, particularly the poles 5 for magnetically driving the armature 9 suffer great magnetic reactions, and the yoke 4 and the poles 5 need to be firmly bonded in order to ensure a strength high enough to withstand the reactions. Moreover, since the intermediate bracket 6 and the ring gear 7 are fitted on the inner peripheral surface of the yoke 4, the assembling job of the starter is complicated. Another disadvantage is that the number of constituent parts becomes large.

SUMMARY OF THE INVENTION

This invention has been made in order to eliminate the disadvantages of the prior art as mentioned above, and has for its object to provide a starter in which a frame for holding poles and an intermediate bracket as well as a ring gear are unitarily constructed, whereby the number of constituent parts and the number of assembling steps can be curtailed.

BRIEF DESCRIPTION OF THE DRAWINGS

In the drawings, the same symboles indicate the same or corresponding parts.

DESCRIPTION OF THE PREFERRED EMBODIMENT

Figure 2:
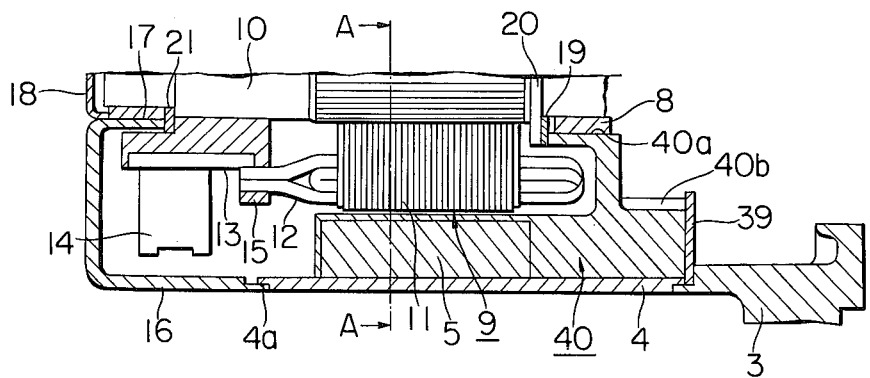
FIG. 2 is a vertical sectional view, partly cut away, of a starter according to an embodiment of this invention.
Figure 3:
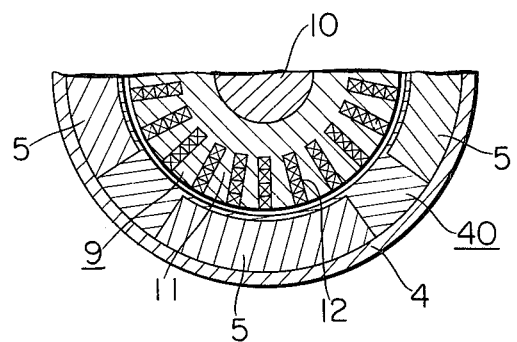
FIG. 3 is a sectional view taken along line A—A in FIG. 2.

Now, an embodiment of this invention will be described with reference to FIGS. 2 and 3. In FIG. 2, numeral 3 indicates a bracket, numeral 4 a yoke, numeral 5 a pole, numeral 8 a sleeve bearing, numeral 9 an armature, numeral 10 a rotary shaft, numeral 11 an armagure core, numeral 12 an armature coil, numeral 13 a commutator, numeral 14 a brush, numeral 15 a bind, numeral 16 a bracket, numeral 17 a sleeve bearing, numeral 18 a cap, and numerals 19, 20 and 21 thrust washers. Since these elements are equivalent to those shown in FIG. 1, the corresponding parts are denoted by the same symbols and will not be explained repeatedly.

Figure 1:
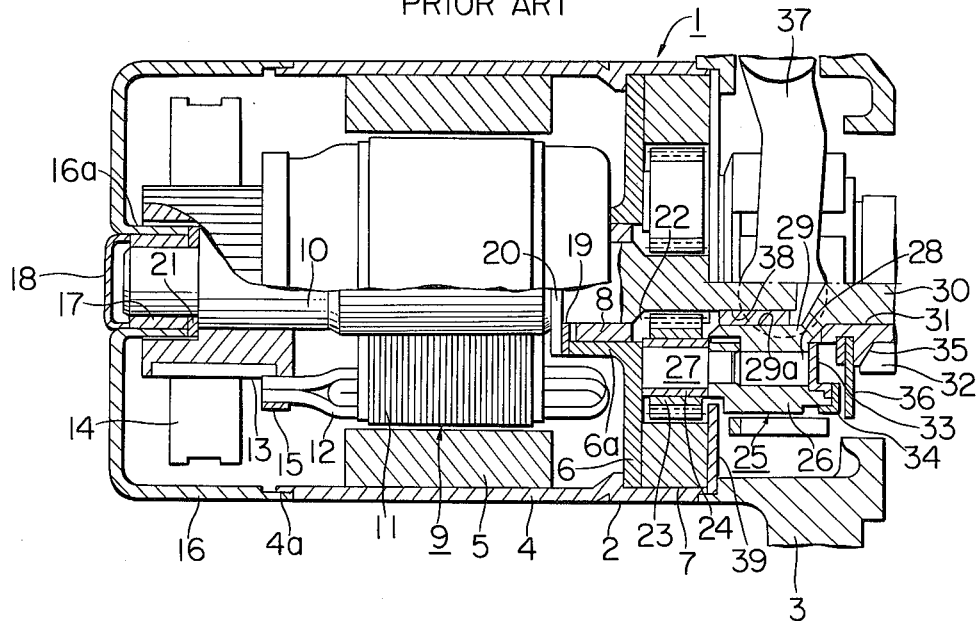
FIG. 1 is a vertical sectional view, partly cut away, of a prior-art starter.

Shown at numeral 40 is an intermediate frame member having a structure wherein the intermediate bracket 6 and the ring gear 7, which have been explained with reference to FIG. 1, are made integral. Further, as illustrated in FIGS. 2 and 3, the intermediate frame member 40 is fastened to the yoke 4 in the state in which it surrounds the outer peripheries of the poles 5, covers the inner circumferences of the permanent magnets, and also intervenes between the respectively adjacent poles. This intermediate frame member 40 is formed of a shaft supporting portion 40a for supporting the rotary shaft 10 through the sleeve bearing 8, and a ring gear portion 40b. The intermediate frame member 40 of such structure can be readily fabricated by the expedient of the molding of a synthetic resin material, the die casting of a nonmagnetic metal material, or the like.

As set forth above, according to this invention, an intermediate bracket and a ring gear having hitherto been separate members are made integral as a single intermediate frame member, so that curtailment in the number of constituent parts is achieved. In addition, since the intermediate frame member has polse held thereon, the bonding strength of the poles can be increased. This brings forth the effect that the durability and reliability of the whole starter are also enhanced.

What is claimed is:

1. A starter comprising:
   a magnet type D.C. motor which includes a generally cylindrical yoke, a plurality of fixed poles comprising permanent magnet pole pieces fastened to the inside of said yoke at circumferentially spaced locations, and a rotary armature arranged in opposition to said poles,
   planetary reduction gears which are provided at an end part of an output shaft of said rotary armature, and
   an integral intermediate frame member which is fastened to said yoke; which includes a shaft supporting portion for supporting said output shaft of said rotary armature through a sleeve bearing, and a ring gear portion cooperating with said planetary reduction gears; and said intermediate frame member further surrounding the outer peripheries of and covering the inner circumferences of the respective pole pieces and said intermediate frame member also intervening between the circumferentially spaced pieces.

2. A starter with a magnet type D.C. motor as defined in claim 1, wherein said intermediate frame member including said ring gear portion is formed by molding of a synthetic resin material.

3. A starter with a magnet type D.C. motor as defined in claim 1, wherein said intermediate frame member including said ring gear portion is formed by die casting of a nonmagnetic metal material.

* * * * *